(12) United States Patent
Peng et al.

(10) Patent No.: US 11,985,558 B2
(45) Date of Patent: May 14, 2024

(54) TERMINAL APPARATUS AND BASE STATION APPARATUS IN WIRELESS COMMUNICATION SYSTEM IN WHICH HANDOVER INCLUDING RELAY TRANSMISSION PATH IS EXECUTED, CONTROL METHOD THEREOF, AND STORAGE MEDIUM

(71) Applicant: KDDI CORPORATION, Tokyo (JP)

(72) Inventors: Hailan Peng, Fujimino (JP); Takeo Ohseki, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 17/897,662

(22) Filed: Aug. 29, 2022

(65) Prior Publication Data

US 2022/0417808 A1 Dec. 29, 2022

Related U.S. Application Data

(63) Continuation of application No. 17/130,366, filed on Dec. 22, 2020, now Pat. No. 11,457,388, which is a (Continued)

(30) Foreign Application Priority Data

Jul. 12, 2018 (JP) .................. 2018-132196

(51) Int. Cl.
*H04W 36/00* (2009.01)
*H04W 40/36* (2009.01)

(52) U.S. Cl.
CPC . *H04W 36/00837* (2018.08); *H04W 36/0061* (2013.01); *H04W 36/00835* (2018.08); *H04W 40/36* (2013.01)

(58) Field of Classification Search
None
See application file for complete search history.

(56) References Cited

U.S. PATENT DOCUMENTS

2007/0086388 A1 4/2007 Kang et al.
2008/0316968 A1 12/2008 Sun et al.
(Continued)

FOREIGN PATENT DOCUMENTS

EP 3 806 543 A1 4/2021
JP 2003-230167 A 8/2003
(Continued)

OTHER PUBLICATIONS

3rd Generation Partnership Project; Technical Specification Group Radio Access Network; Evolved Universal Terrestrial Radio Access (E-UTRA); Relay architectures for E-UTRA (LTE-Advanced)(Release 9), 3GPP TR 36.806, V9.0.0, Mar. 2010.
(Continued)

*Primary Examiner* — Suhail Khan
(74) *Attorney, Agent, or Firm* — Foley & Lardner LLP

(57) ABSTRACT

A terminal apparatus that performs communication using a communication path set between the terminal apparatus and a core network via a base station apparatus connected to the core network or via the base station apparatus and a relay apparatus that relays communication with the base station apparatus acquires information regarding candidates of a communication path to which switching should be performed from a first communication used, from the base station apparatus that functions as a serving base station in the first communication path, determines whether or not to perform switching of the communication path from the first communication path, and performs switching from the first communication path to a second communication path included in the candidates without being instructed by the serving base station, in response to the determination to
(Continued)

perform the switching after receiving the information regarding the candidates.

15 Claims, 4 Drawing Sheets

Related U.S. Application Data continuation of application No. PCT/JP2019/027193, filed on Jul. 9, 2019.

(56) References Cited

U.S. PATENT DOCUMENTS

| | | | |
|---|---|---|---|
| 2010/0124924 A1 | 5/2010 | Cheng et al. |
| 2018/0206140 A1 | 7/2018 | Panteleev et al. |
| 2019/0021036 A1 | 1/2019 | Shimizu et al. |
| 2021/0014771 A1 | 1/2021 | Peng et al. |

FOREIGN PATENT DOCUMENTS

| | | | |
|---|---|---|---|
| JP | 2007-116696 A | 5/2007 |
| JP | 2012-509029 A | 4/2012 |
| JP | 2017-120993 A | 7/2017 |

OTHER PUBLICATIONS

Extended European Search Report issued in corresponding European Patent Application 19834021.8 dated Jul. 30, 2021.
Japanese Office Action corresponding to Japanese Divisional Patent Application No. 2021-174053, dated Aug. 12, 2022, with English machine translation.

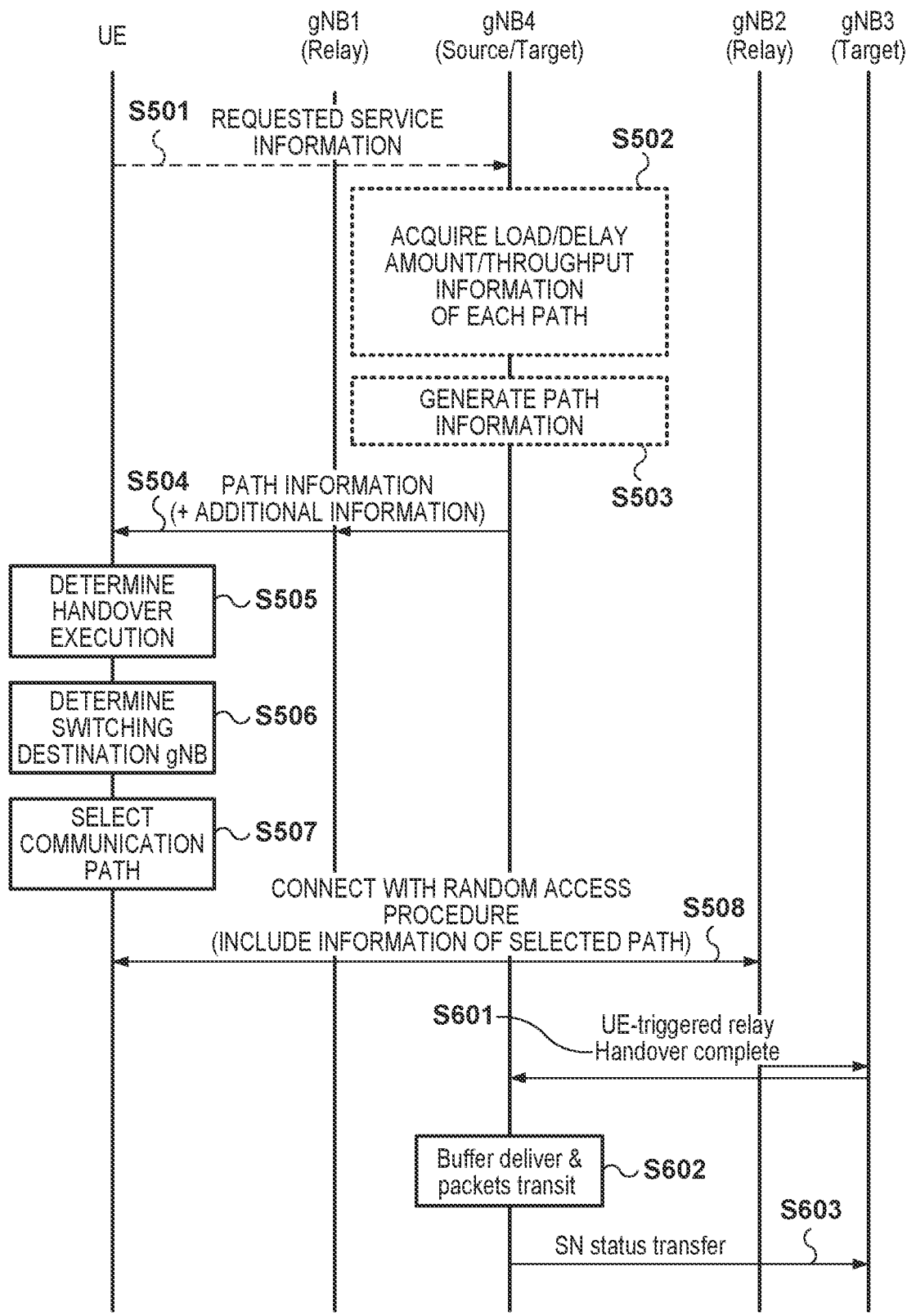

TERMINAL APPARATUS AND BASE STATION APPARATUS IN WIRELESS COMMUNICATION SYSTEM IN WHICH HANDOVER INCLUDING RELAY TRANSMISSION PATH IS EXECUTED, CONTROL METHOD THEREOF, AND STORAGE MEDIUM

CROSS-REFERENCE TO RELATED APPLICATION(S)

This application is a continuation of U.S. application Ser. No. 17/130,366, filed on Dec. 22, 2020, which is a continuation of International Patent Application No. PCT/JP2019/027193, filed on Jul. 9, 2019, which claims priority to and the benefit of Japanese Patent Application No. 2018-132196 filed on Jul. 12, 2018, the entire disclosures of which are incorporated herein by reference.

TECHNICAL FIELD

The present invention relates to a terminal apparatus and a base station apparatus, a control method thereof, and a storage medium, and specifically relates to a control technique when a handover including a relay transmission path is executed.

BACKGROUND ART

In recent years, a method of connecting a terminal apparatus, in a cellular communication system, to a relay apparatus that relays communication with a base station, instead of directly connecting the terminal apparatus to the base station that is to be connected to a core network has been studied (refer to NPL 1).

CITATION LIST

Non-Patent Literature

NPL 1: 3GPP TR 36.806, V9.0.0, March 2010

SUMMARY OF INVENTION

Technical Problem

Although the mobility management of a terminal apparatus is important in a system in which a relay transmission path formed by a relay apparatus is used as well, it is not apparent how the handover processing in the terminal apparatus is to be executed in such a system. Specifically, when the terminal apparatus switches the connection destination from one relay apparatus to another relay apparatus, an inconvenience such as a reduction in communication speed or communication being not possible in some cases may be incurred, unless the relay path is appropriately set.

Solution to Problem

The present invention provides a handover procedure suitable for a cellular communication system in which a relay transmission path is used.

A terminal apparatus according to one aspect of the present invention is a terminal apparatus that performs communication using a communication path that is set between the terminal apparatus and a core network via a base station apparatus that is connected to the core network or via the base station apparatus and a relay apparatus that relays communication with the base station apparatus. The terminal apparatus includes: an acquiring unit configured to acquire information regarding candidates of a communication path to which switching is to be performed from a first communication path that is being used, from the base station apparatus that functions as a serving base station in the first communication path; a determining unit configured to determine whether or not switching of the communication path from the first communication path is to be performed; and a performing unit configured to perform switching from the first communication path to a second communication path included in the candidates without being instructed by the serving base station, in response to the determination that switching of the communication path from the first communication path is to be performed after receiving the information regarding the candidates.

A base station apparatus according to another aspect of the present invention is a base station apparatus that functions as a serving base station with respect to a terminal apparatus that performs communication using a communication path that is set between the terminal apparatus and a core network via the base station apparatus that is connected to the core network or via the base station apparatus and a relay apparatus that relays communication with the base station apparatus. The base station apparatus is characterized by including: a notifying unit configured to notify the terminal apparatus of information regarding candidates of a communication path that is a switching destination from a first communication path that is used by the terminal apparatus and the first communication path, wherein the terminal apparatus, upon determining that switching of the communication path from the first communication path is to be performed after receiving the information regarding the candidates, executes switching from the first communication path to a second communication path included in the candidates without being instructed by the serving base station.

Advantageous Effects of Invention

According to the present invention, the handover processing of a terminal apparatus can be appropriately accomplished in a cellular communication system using a relay transmission path.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 6 is a diagram illustrating an example of the processing flow to be executed in the system.

DESCRIPTION OF EMBODIMENTS

Figure 1:
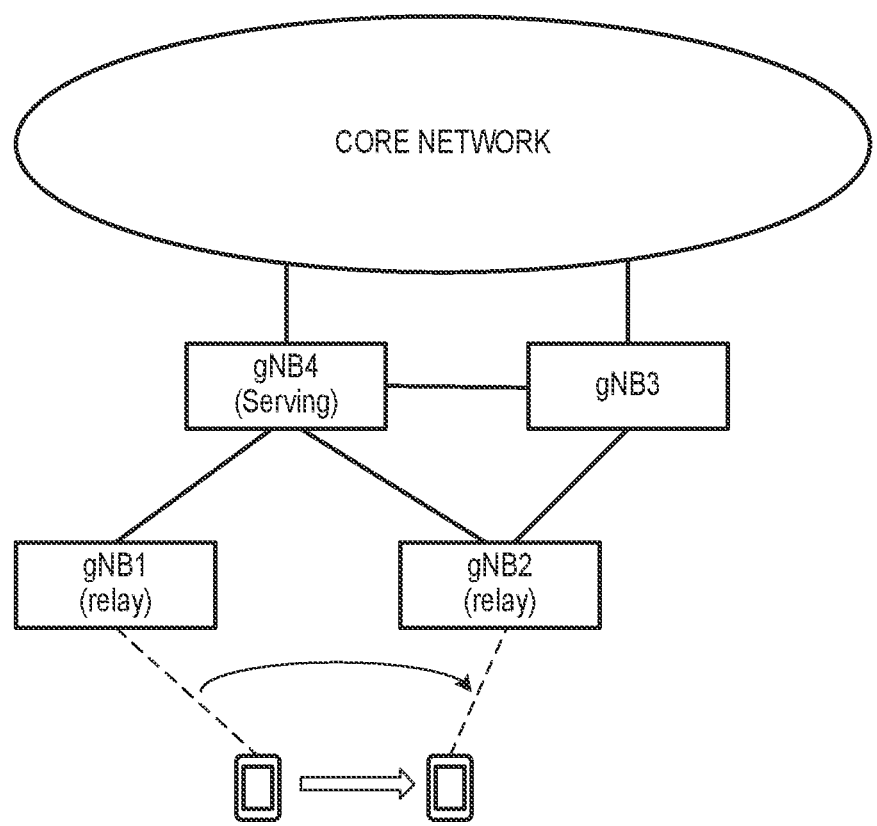
FIG. 1 is a diagram illustrating an exemplary configuration of a wireless communication system.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 shows an exemplary configuration of a wireless communication system according to the present embodiment. This wireless communication system is an LTE (Long Term Evolution) system or a cellular communication system of the fifth generation or later, in one example. Note that, there is no limitation thereto, and the following discussion can also be applied to any wireless communication system that is similarly configured.

The wireless communication system is constituted by including relay apparatuses (gNB1 and gNB2 in FIG. 1). Note that gNB1 and gNB2 may be recognized by a terminal apparatus as relay apparatuses, or may be recognized as base station apparatuses similar to another base station apparatus that does not perform a relay operation. Also, in the following, a description will be given assuming that a terminal apparatus is to be connected to a relay apparatus, but the terminal apparatus may also be connected to a base station apparatus, such as gNB3 or gNB4, that is directly connected to a core network. Note that "directly connected to a core network" indicates a state of connection with the core network through a communication path that does not include a relay apparatus to which the terminal apparatus can be connected. That is, in FIG. 1, gNB3 and gNB4 are base station apparatuses that are directly connected to the core network, and gNB1 and gNB2 are relay apparatuses that are not directly connected to the core network. Note that gNB1 and gNB2 may also be classified as base station apparatuses, but in the present embodiment, these may be referred to as relay apparatuses, except for cases where it is specifically needed.

In the present embodiment, a terminal apparatus is connected to gNB4 using gNB1 as a relay apparatus. Here, gNB4 is a base station apparatus that is directly connected to the core network, and has a mobility management function, for example. In one example, such a base station apparatus having the mobility management function serves as a serving base station for the terminal apparatus. That is, the terminal apparatus is directly connected to gNB1, but if gNB1 does not have the mobility management function, the serving base station for this terminal apparatus is gNB4 having the mobility management function. Also, the terminal apparatus may be connected to the core network through a communication path that includes a plurality of base station apparatuses that are directly connected to the core network. In this case, the base station apparatus closest to the core network in the communication path is the serving base station. For example, when the terminal apparatus is connected to the core network through a communication path from gNB2 to gNB3, gNB4, and the core network, the serving base station of the terminal apparatus is gNB4. Note that the terminal apparatus may be directly connected to gNB3 or gNB4 depending on the radio wave intensity or the like. That is, the relay communication path need not be necessarily used.

In the present embodiment, it is assumed that the terminal apparatus moves to an area covered by gNB2 from a state of being connected to gNB1, and handover to gNB2 is performed, as shown in FIG. 1. Here, the relay communication path from the terminal apparatus to the core network may be one of (1) from gNB2 to gNB4 and the core network, (2) from gNB2 to gNB3 and the core network, and (3) from gNB2 to gNB3, gNB4, and the core network, for example. One of the communication paths may be selected such that a delay time is a predetermined value or less, or a base station apparatus that can handle the service requested by the terminal apparatus is the serving base station, for example. For example, if gNB3 cannot handle the service requested by the terminal apparatus, the communication path (1) or (3) may be selected such that the serving base station is gNB4. Also, the communication path may also be selected in accordance with the loads of the respective base station apparatuses and the relay apparatuses. That is, the configuration may be such that a communication path including a base station apparatus or a relay apparatus whose load is high is not selected. In this way, it is important to appropriately set the communication path at the time of handover by making selection regarding which of the communication paths is to be used, in a system in which relay communication is used.

In the next generation cellular communication system, it is envisioned that beams for covering a narrow range area (cell) are formed in order to effectively utilize the frequency resource. According to such further downsizing of the cell, when the terminal apparatus moves, the occurrence frequency of handover may increase. Therefore, it is important to reduce the service interruption time in one handover. Accordingly, in the present embodiment, the terminal apparatus autonomously executes handover, instead of the network (serving base station) instructing the terminal apparatus to execute handover.

In order to execute such handover, the serving base station (e.g., gNB4) before handover needs to notify the connected terminal apparatus of information necessary for handover, in advance. For example, gNB4 notifies, in advance, the terminal apparatus of information regarding another base station apparatus (relay apparatus) that is a candidate of the connection destination switching from the serving base station, as information regarding the candidate base station apparatus of the handover destination. The information regarding the candidate base station apparatus may include identification information of a cell provided by the candidate base station apparatus, and information to be used in a procedure for connecting to the candidate base station apparatus, in one example. Here, the identification information may be an NR Cell Global ID (NCGI) of the candidate base station apparatus, for example. Note that the NCGI is a global ID of the cell that is determined by the combination of a Public Land Mobile Network ID (PLMN ID) and an NR Cell Identity (NCI). Also, the connection procedure is a random access procedure, for example, and the information to be used in the connection procedure may include information regarding beams formed by the candidate base station apparatus, routing information (Tracking Area ID (TAI)), frequency information, and the like, in one example.

gNB4 of the present embodiment notifies, in advance, the terminal apparatus information (path information) regarding a communication path that the terminal apparatus can use, in addition to these pieces of information. Also, the terminal apparatus, when executing autonomous handover, selects one communication path based on the notified path information, and notifies the base station apparatus (relay apparatus) that is the connection switching destination of the information regarding the selected communication path. With this notification, the base station apparatus (relay apparatus) that is the connection switching destination sets the communication path designated by the terminal apparatus, for example, and therefore a communication path with which the service requested by the terminal apparatus cannot be handled can be prevented from being set.

Here, the communication path notified by gNB4 may include all of the communication paths that gNB4 can provide as the serving base station. Such an area that can be provided by one serving base station may be called as a cell area. With this, with respect to a terminal apparatus to which gNB4 is providing service as the serving base station, the service can be reliably continuously provided after the handover, for example. Also, the communication path notified by gNB4 may include all of the communication paths that gNB4 and other base station apparatuses that are present in a surrounding region of gNB4 and can function as the serving base station can provide, for example. Note that, the other base station apparatuses mentioned here may be base station apparatuses that can function as serving base stations belonging to an RNA (RAN-based Notification Area) of the NR (New Radio), which is the fifth generation cellular communication system. Also, all of the communication paths that can be provided by base station apparatuses that can function as the serving base stations belonging to the same tracking area as gNB4 may also be notified. With this, the terminal apparatus may be notified of the path information regarding communication paths with which, when the terminal apparatus has moved out of the range in which gNB4 can provide communication service as the serving base station, the terminal apparatus can maintain the communication service. Also, with this, the terminal apparatus is provided with information regarding a plurality of candidate communication paths, and therefore the terminal apparatus can switch the connection by selecting one most appropriate communication path. Also, a range of the communication paths, other than those, that gNB4 needs to take into consideration (notify the terminal apparatus) may also be specified.

The path information may include information for designating a base station apparatus (relay apparatus) included in the communication path. For example, information in which pieces of identification information of base station apparatuses included in the communication path are arranged in an order from a relay apparatus to which the terminal apparatus is directly connected to a base station apparatus that is directly connected to the core network, or in a reverse order thereof, may be notified as the path information. With this, the terminal apparatus can recognize through which of communication paths communication after handover can be continued, and can execute handover by autonomously selecting a communication path with which the number of hops (number of relays) is smallest among the handover destination candidates, for example. Note that when the serving base station notifies the terminal apparatus of all pieces of path information that are possible to be used, in this way, the serving base station may perform this information notification using a broadcast signal, for example. Note that the transmission of a broadcast signal, here, is performed such that all of the terminal apparatuses inside the cell that is formed by all of the communication paths in which the base station functions as the serving base station are notified of the information. That is, the serving base station itself may transmit a broadcast signal, or in addition thereto or instead thereof, a relay apparatus that relays signals from the serving base station may transmit the broadcast signal. With this, a plurality of terminal apparatuses can be notified of information at the same time, and therefore the signaling overhead can be suppressed.

Note that, in the NR, a network slicing technique is used in which a network is defined for each service. Also, the network slices to be supported may be different for each base station apparatus. That is, some base station apparatuses may support all of the network slices and provide all of the services, but the other some base station apparatuses may support some of the network slices and not be able to provide some services. Here, if gNB4 notifies the terminal apparatus of path information of a communication path in which another base station apparatus is the serving base station, without considering the service requested by the terminal apparatus, as a result of the terminal apparatus having autonomously performed handover, the service may not be provided with the communication path that is the connection switching destination.

Therefore, gNB4 may extract communication paths with which the service can be provided based on the information regarding the service requested by the terminal apparatus, and notify the terminal apparatus of the path information regarding the extracted communication paths. Here, the information regarding the service requested by the terminal apparatus is Network Slice Selection Assistance Information (NSSAI), for example. The NSSAI includes at least one Single-NSSAI (S-NSSAI), and each network slice is uniquely identified by the S-NSSAI. Note that a specific network slice supports only a specific Access and Mobility management Function (AMF). Each base station apparatus that can function as the serving base station can manage, as the information regarding the switching destination of the communication path of a terminal apparatus that is connected to the base station apparatus serving as the serving base station, an AMF ID (or a plurality of pieces of S-NSSAI information) of the serving base station of the communication path in addition to the NCGI, beam information, routing information, and frequency information, for example. Each base station apparatus that can function as the serving base station acquires the NSSAI, which is information regarding a service requested by the connected terminal apparatus, selects, as the candidate, a communication path in which another base station apparatus having the AMF ID or the S-NSSAI information corresponding to the acquired NSSAI will serve as the serving base station, out of the path information that is possible to be used by the terminal apparatus after handover. Also, the base station apparatus transmits the path information regarding the selected communication path to the connected terminal apparatus, and does not transmit path information regarding the unselected communication path. The terminal apparatus may execute the autonomous handover, as described above, in response to an occurrence of a predetermined trigger after acquiring these pieces of information. According to such a configuration, the terminal apparatus is provided with path information regarding a communication path with which a service requested by the terminal apparatus can be provided, as the path information of the communication path that is the connection switching destination, and therefore can be prevented from entering a state of not being able to be provided with the communication service after connection switching.

Also, the path information may include the load situation of the communication path. That is, gNB4 may also transmit, when performing notification of all of the communication paths that may be used, as described above, or some path information regarding a communication path with which the service provided to the terminal apparatus can be handled, information indicating whether or not the load of the communication path is high. The terminal apparatus can autonomously select the communication path that is the handover destination, by selecting a communication path whose load is low based on the load information, for example. Similarly, information regarding the throughput that can be obtained in each communication path may be included in the path information. Based on this information and a prediction value of the amount of data that the terminal apparatus transmits and receives, if a prediction value is large, the terminal apparatus may execute handover by selecting a communication path with which a sufficient throughput can be obtained. On the other hand, when only a small amount of data is to be transmitted or the like, the terminal apparatus may determine the communication path that is the handover destination, without depending on the information regarding throughput.

Also, the path information may include information regarding the transmission delay in each communication path, for example. The terminal apparatus can execute handover by selecting, based on this information, a communication path with which the condition of the delay amount allowed in the service requested by the terminal apparatus is satisfied. Note that the terminal apparatus can specify the number of hops in a path until the core network from the number of base stations and the relay apparatuses that are indicated by the path information. Therefore, the terminal apparatus can also execute handover by selecting a communication path with which the number of hops is small. Note that gNB4 may also acquire information regarding the delay amount requested by the terminal apparatus in advance, and transmit only the path information regarding the communication path with which the request regarding the delay amount can be satisfied (or possibly satisfied) to the terminal apparatus.

Also, the path information may also include information regarding the reliability in each communication path, for example. The information regarding the reliability of the communication path may include information regarding the error rate (frame error rate, bit error rate), the number of re-transmissions until the communication success, or the like, when communication is performed using the communication path, for example. The terminal apparatus can execute handover by selecting, based on this information, a communication path that meets the reliability information with which the needed reliability can be satisfied, in the communication performed by the terminal apparatus. For example, the terminal apparatus that needs to perform highly reliable communication may execute handover by preferentially selecting a communication path whose reliability is high.

Also, the terminal apparatus can determine the communication path that is the handover destination based on the combination of the pieces of information described above. For example, the terminal apparatus, when performing communication for a service that requires a low delay, may execute handover by excluding a communication path that is loaded by an amount of not being able to perform communication and selecting a communication path with which the delay or the number of hops is small. Also, the terminal apparatus, when performing communication for a service that does have a strict request regarding the delay, may execute handover by selecting a communication path whose load is small, without considering the delay or the number of hops.

In the following, an example of the configuration of such apparatuses and the processing flow to be executed will be described.

Hardware Configuration

Figure 2:
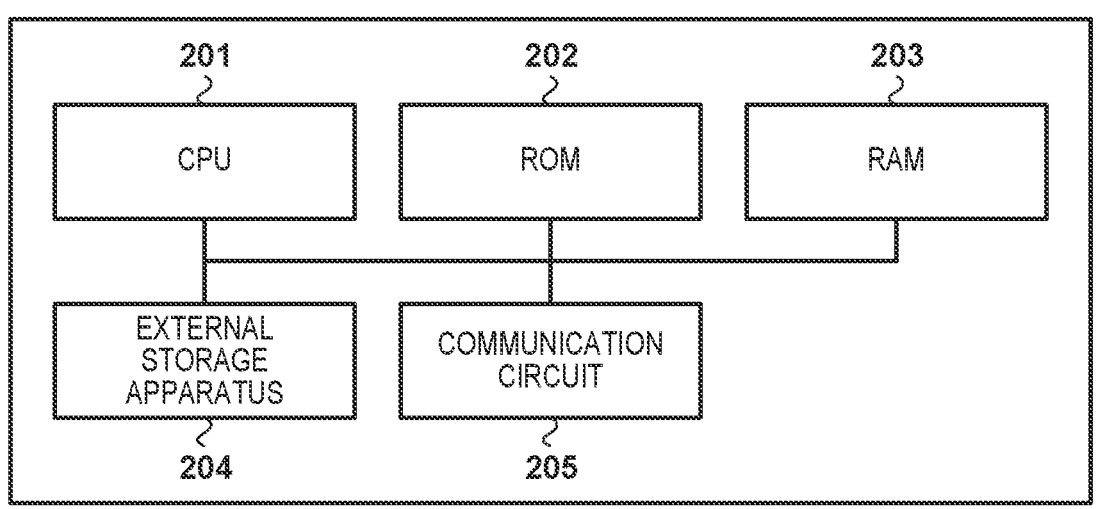
FIG. 2 is a diagram illustrating an exemplary configuration of an apparatus.

FIG. 2 shows an exemplary hardware configuration of the base station apparatus and the terminal apparatus. Note that the base station apparatus described below may be a base station apparatus that can mainly function as the serving base station, and is directly connected to the core network, but a base station apparatus that functions as the relay apparatus may also have a similar hardware configuration. The base station apparatus and the terminal apparatus have, in one example, a hardware configuration as shown in FIG. 2, and include a CPU 201, a ROM 202, a RAM 203, an external storage apparatus 204, and a communication circuit 205, for example. In the base station apparatus and the terminal apparatus, programs for realizing the functions of the base station apparatus and the terminal apparatus that are recorded in one of the ROM 202, the RAM 203, and the external storage apparatus 204 are executed by the CPU 201.

Also, the base station apparatus and the terminal apparatus perform communication with another apparatus by the CPU 201 controlling the communication circuit 205, for example. Note that the communication circuit 205 of the base station apparatus can perform communication with another base station apparatus or another network node through a wire circuit, for example. Also, the communication circuit 205 of the base station apparatus may be able to perform wireless communication with a terminal apparatus by forming one or more (a plurality of) beams. Also, in this case, the communication circuit 205 of the terminal apparatus is configured to perform wireless communication by connecting to a base station apparatus through at least any of the beams formed by the communication circuit 205 of the base station apparatus. Note that, in the configuration shown in FIG. 2, a schematic diagram is illustrated in which the base station apparatus and the terminal apparatus include one communication circuit 205, but there is no limitation thereto, and may include a plurality of communication circuits. For example, the base station apparatus may include a first communication circuit for wired communication with another base station apparatus and a second communication circuit for wireless communication with another terminal apparatus. Also, the terminal apparatus may also include a first communication circuit for the NR and a second communication circuit for the LTE (Long Term Evolution). Also, the terminal apparatus may also include a wireless communication circuit conforming to a standard other than the cellular such as a wireless LAN, or moreover may include a wired communication circuit to be used for wired connection with a USB connection or the like.

Note that, the base station apparatus and the terminal apparatus may include dedicated hardware for executing the functions, or may execute some functions by hardware, and execute other functions by a computer executing a program. Also, all of the functions may be executed by a computer and a program.

Functional Configuration

Figure 3:
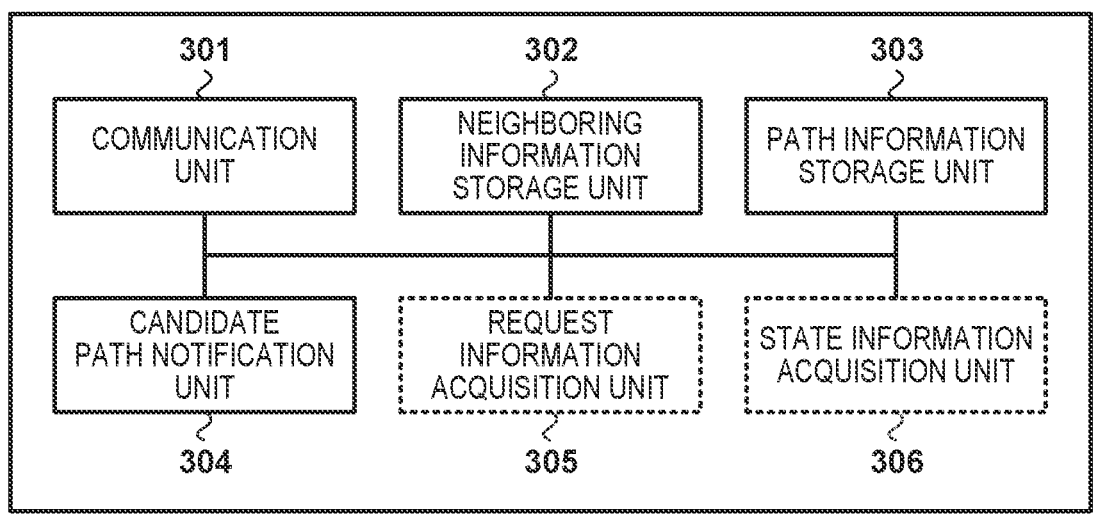
FIG. 3 is a diagram illustrating an exemplary functional configuration of a base station apparatus.

FIG. 3 shows an exemplary functional configuration of the base station apparatus (base station apparatus that can operate as the serving base station with respect to a terminal apparatus). The base station apparatus includes a communication unit 301, a neighboring information storage unit 302, a path information storage unit 303, and a candidate path notification unit 304, for example. Also, the base station apparatus may optionally include a request information acquisition unit 305 and a state information acquisition unit 306.

The communication unit 301 executes wired/wireless communication with another base station apparatus, and wireless communication with a connected terminal apparatus.

The neighboring information storage unit 302 stores, in each of a plurality of communication paths in which the base station apparatus serves as the serving base station, with respect to an area (cell) provided by a relay apparatus that is to be directly connected to a terminal apparatus, information regarding the base station apparatus or the relay apparatus that provide an area adjacent to the area. That is, the neighboring information storage unit 302 stores information regarding a base station apparatus or a relay apparatus that is to be the candidate of the connection switching destination, when the terminal apparatus executes handover. Note that the neighboring information storage unit 302 may also include information regarding a relay apparatus in a relay transmission path that is formed by the base station apparatus serving as the serving base station, as the neighboring information. That is, the neighboring information storage unit 302 stores, as the neighboring information, information regarding relay apparatuses or the like relating to a plurality of communication paths in which the base station apparatus serves as the serving base station, in addition to information regarding relay apparatuses relating to a plurality of communication paths in which other apparatuses in the surrounding region serve as the serving base station. The information stored here may include the NCGI, beam information, routing information, and the AMF ID (or information regarding a plurality pieces of S-NSSAI), for example. Note that the neighboring information storage unit 302 may include an Automatic Neighbor relation (ANR) function of automatically constructing a neighboring relationship when the number of base station apparatuses that are in a neighboring relationship has increased or decreased.

The path information storage unit 303 stores information for specifying the communication path between a base station apparatus or a relay apparatus that is stored in the neighboring information storage unit 302 and the core network. That is, the path information regarding the communication path to be used after handover when the terminal apparatus has executed handover is stored.

The candidate path notification unit 304 notifies a terminal apparatus of information regarding the communication path that is a switching destination to which the communication path that is currently used by the terminal apparatus may be possibly switched by handover. In one example, the candidate path notification unit 304 may transmit information, by a broadcast signal, regarding communication paths in which all of the base station apparatuses or the relay apparatuses that are stored in the neighboring information storage unit 302 are respectively end apparatuses. Also, the candidate path notification unit 304 separately notifies a terminal apparatus of path information regarding a communication path in which a base station apparatus or a relay apparatus that constructs a cell adjacent to the cell in which the terminal apparatus is present is an end apparatus (that is to be directly connected to the terminal apparatus). Such a separate signaling is performed by RRC (Radio Resource Control) signaling, on-demand SI (System Information), or the like.

As described above, the base station apparatus notifies a terminal apparatus of not only information regarding the candidates of a base station apparatus and a relay apparatus that are connection switching destinations by handover, but also information regarding the candidate communication paths in which the base station apparatus and the relay apparatus are end apparatuses. Note that when the information regarding the candidate communication path includes information regarding a base station apparatus and a relay apparatus that are included in the communication path, the base station apparatus may transmit the information regarding the candidate communication path, and need not transmit information regarding candidates of the base station apparatus and the relay apparatus that are connection switching destinations.

The candidate path notification unit 304 may restricts the candidate communication path to be notified to a terminal apparatus based on information regarding a service requested by the terminal apparatus that is acquired by the request information acquisition unit 305 (from the terminal apparatus, for example). For example, the request information acquisition unit 305 may receive a message (registration request) requesting registration from a terminal apparatus that is not registered, and acquires the NSSAI in the message as the information regarding the service requested by the terminal apparatus. Also, the request information acquisition unit 305 may acquire, regarding a registered terminal apparatus, information regarding the service requested by the terminal apparatus that is managed at a predetermined node in the network from the predetermined node. Also, depending on the case, the request information acquisition unit 305 may acquire, when a terminal apparatus has been transitioned by handover from the control of another serving base station, the information regarding the service requested by the terminal apparatus from the base station apparatus from which handover has been performed. The candidate path notification unit 304 may extract path information with which the serving base station can execute the service requested by a terminal apparatus, from the pieces of path information stored in the path information storage unit 303, and may notify the terminal apparatus of only the extracted path information, for example.

Also, the candidate path notification unit 304 may transmit the path information to be notified by adding thereto at least one of information indicating the load state, information regarding the delay amount, information regarding the throughput, and information regarding the reliability, in each communication path to be notified. That is, the candidate path notification unit 304 may notify a terminal apparatus of, in addition to information regarding the base station apparatus and the relay apparatus that constitute the communication path, state information indicating whether or not the load of each path (the base station apparatus or the relay apparatus in the path, depending on the case) is high, an estimated delay amount when the path is used, information regarding the throughput estimated to be able to obtain, and information regarding the reliability. With this, various determination criteria can be given when a terminal apparatus selects a path.

Figure 4:
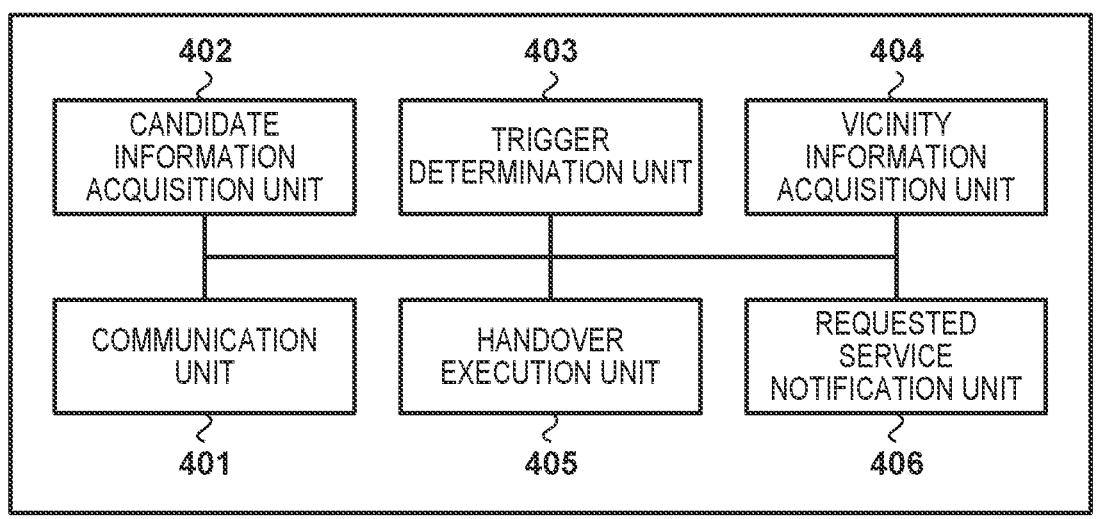
FIG. 4 is a diagram illustrating an exemplary functional configuration of a terminal apparatus.

FIG. 4 is a diagram illustrating the exemplary functional configuration of the terminal apparatus. The terminal apparatus includes a communication unit 401, a candidate information acquisition unit 402, a trigger determination unit 403, a vicinity information acquisition unit 404, a handover execution unit 405, and a requested service notification unit 406, for example.

The communication unit 401 establishes wireless connection with a base station apparatus or a relay apparatus in the surrounding region, and performs communication with the core network using a communication path that is set so as to include the connected base station apparatus or relay apparatus. Also, the communication unit 401 receives a radio signal from a base station apparatus or a relay apparatus that is not connected, and can acquire cell identification information (e.g., PCI) or the like that is included in the radio signal.

The candidate information acquisition unit 402 acquires path information regarding the candidate communication path that is a switching destination from the currently used communication path, from the serving base station (via a relay apparatus if necessary). The candidate information acquisition unit 402 may acquire, from the serving base station that is connected using a communication path that is currently used, path information regarding all of the communication paths that may be the switching destination from the communication path, for example. Also, the candidate information acquisition unit 402 may acquire path information regarding the communication path that is the switching destination extracted by the serving base station according to the information regarding a service requested by the terminal apparatus. Note that the candidate information acquisition unit 402 specifies, from the information regarding the candidate communication paths, a base station apparatus or a relay apparatus that is an end apparatus in each communication path and to which the terminal apparatus should be directly connected, and acquires information regarding the base station apparatus or relay apparatus, for example. Note that the information regarding the base station apparatus or relay apparatus may include identification information of the cell formed by the base station apparatus or relay apparatus (e.g., NCGI) and information (e.g., beam information, routing information, frequency information) to be used in a connection procedure with the base station apparatus or relay apparatus, for example. The path information may include these pieces of information, or these pieces of information may be acquired separately from the path information.

The trigger determination unit 403 determines a trigger for the terminal apparatus to start handover such as the quality of a radio signal from a base station apparatus or a relay apparatus to which the terminal apparatus is directly connected having decreased below a predetermined level, the delay amount having exceeded a predetermined value due to the load of the serving base station having exceeded a predetermined value, or the resource amount assigned by the serving base station being a predetermined amount or less, for example. Note that the trigger determination unit 403 may determine any trigger for the terminal apparatus to autonomously start handover.

The vicinity information acquisition unit 404, when the trigger determination unit 403 has detected a trigger for starting handover, for example, observes radio signals from base station apparatuses or relay apparatuses to which the terminal apparatus is not connected and that are present in the surrounding region, and acquires the identification information (PCI) of these apparatuses. Note that the vicinity information acquisition unit 404 may also measure radio quality such as received power of radio signals from base station apparatuses or relay apparatuses in the surrounding region. Also, the vicinity information acquisition unit 404 determines whether or not identification information of a base station apparatus or a relay apparatus in the neighboring region is present that corresponds to the identification information of a base station apparatus or a relay apparatus that is an end apparatus (that may be directly connected to the terminal apparatus) in the path information acquired by the candidate information acquisition unit 402. The vicinity information acquisition unit 404, when the candidate information acquisition unit 402 has acquired path information regarding a communication path regarding which identification information of an apparatus that is an end apparatus corresponds to the identification information of a base station apparatus or a relay apparatus in the surrounding region, determines the base station apparatus or relay apparatus in the surrounding region as the target of handover. Moreover, the vicinity information acquisition unit 404 determines the communication path in which the base station apparatus or relay apparatus that has been determined as the target of handover is an end apparatus as the communication path after switching. Note that if there are a plurality of such candidate communication paths, the vicinity information acquisition unit 404 may determine, out of the plurality of candidate communication paths, the communication path regarding which the radio quality of a radio signal from the end apparatus is most favorable, or the communication path regarding which the radio quality exceeds a predetermined criterion as the communication path that is the switching destination. Also, the vicinity information acquisition unit 404, when there are a plurality of communication paths regarding which the radio quality of a radio signal from the end apparatus is favorable, may determines the communication path in which the number of hops is smallest as the communication path after switching, for example.

Also, the vicinity information acquisition unit 404, when having acquired additional information such as information regarding the load, information regarding the delay amount, information regarding the throughput, and information regarding the reliability, along with the path information, may restrict the candidate communication path in accordance with such information and the request from the service being executed by the terminal apparatus, or the like. In this case, communication paths with which the request cannot be satisfied are not considered, and it may be determined whether or not the identification information of a base station apparatus or a relay apparatus that is the end apparatus in a communication path with which the request can be satisfied corresponds to the identification information of a base station apparatus or a relay apparatus in the neighboring region. With this, the communication path can be prevented from being switched to a communication path with which, although the radio quality of a radio signal from the base station apparatus or relay apparatus that is the end apparatus is favorable, the request cannot be satisfied as a whole.

Also, the vicinity information acquisition unit 404 may, in a stage before the trigger determination unit 403 detects a trigger for starting handover, observe the radio signal from a base station apparatus or a relay apparatus that is present in the surrounding region and is not connected, acquire identification information of the apparatus, and measure the received power. For example, the vicinity information acquisition unit 404 may periodically observe the radio signal or the like from a base station apparatus or a relay apparatus in the surrounding region and hold the result, and when the trigger determination unit 403 has detected a trigger for starting handover, may determine the handover target based on the held information. Also, the vicinity information acquisition unit 404 may be configured to, when performing observation of the radio signal or the like from a base station apparatus or a relay apparatus in the surrounding region in advance, hold the results regarding only the apparatus corresponding to the identification information of a base station apparatus or a relay apparatus that is the end apparatus in the path information acquired by the candidate information acquisition unit 402. With this, the vicinity information acquisition unit 404 need not perform processing for extracting information regarding the communication path from the held information, after the trigger determination unit 403 has detected a trigger for starting handover. With this, the period of time needed for the processing after the trigger for starting handover has been detected can be reduced.

The handover execution unit 405 executes the handover to the handover target apparatus that is determined by the vicinity information acquisition unit 404 not via the serving base station. The handover execution unit 405 executes a random access procedure with the target base station apparatus, for example. Also, here, the handover execution unit 405 may transmit the context information of the terminal apparatus to the target base station apparatus. Also, the handover execution unit 405 may transmit the information regarding the communication path that is the switching destination selected here. With this, the network side is notified of the information regarding the communication path to be used, and the communication path appropriate for each terminal apparatus is set according to the notification.

The requested service notification unit 406 notifies the serving base station of the information regarding the service requested by the terminal apparatus. The requested service notification unit 406 notifies the serving base station of the information regarding the service requested by the terminal apparatus by transmitting a registration requesting message at the time of the terminal apparatus being registered to the NR while including the NSSAI, for example. Also, the requested service notification unit 406 may transmit a request message that is transmitted when requesting information regarding the candidate base station apparatus to the serving base station while including information regarding the service requested by the terminal apparatus, for example. Note that the requested service notification unit 406 may also notify the serving base station or another network node via the serving base station of information regarding the service requested by the terminal apparatus by means of signaling other than those.

Processing Flow

Figure 5:
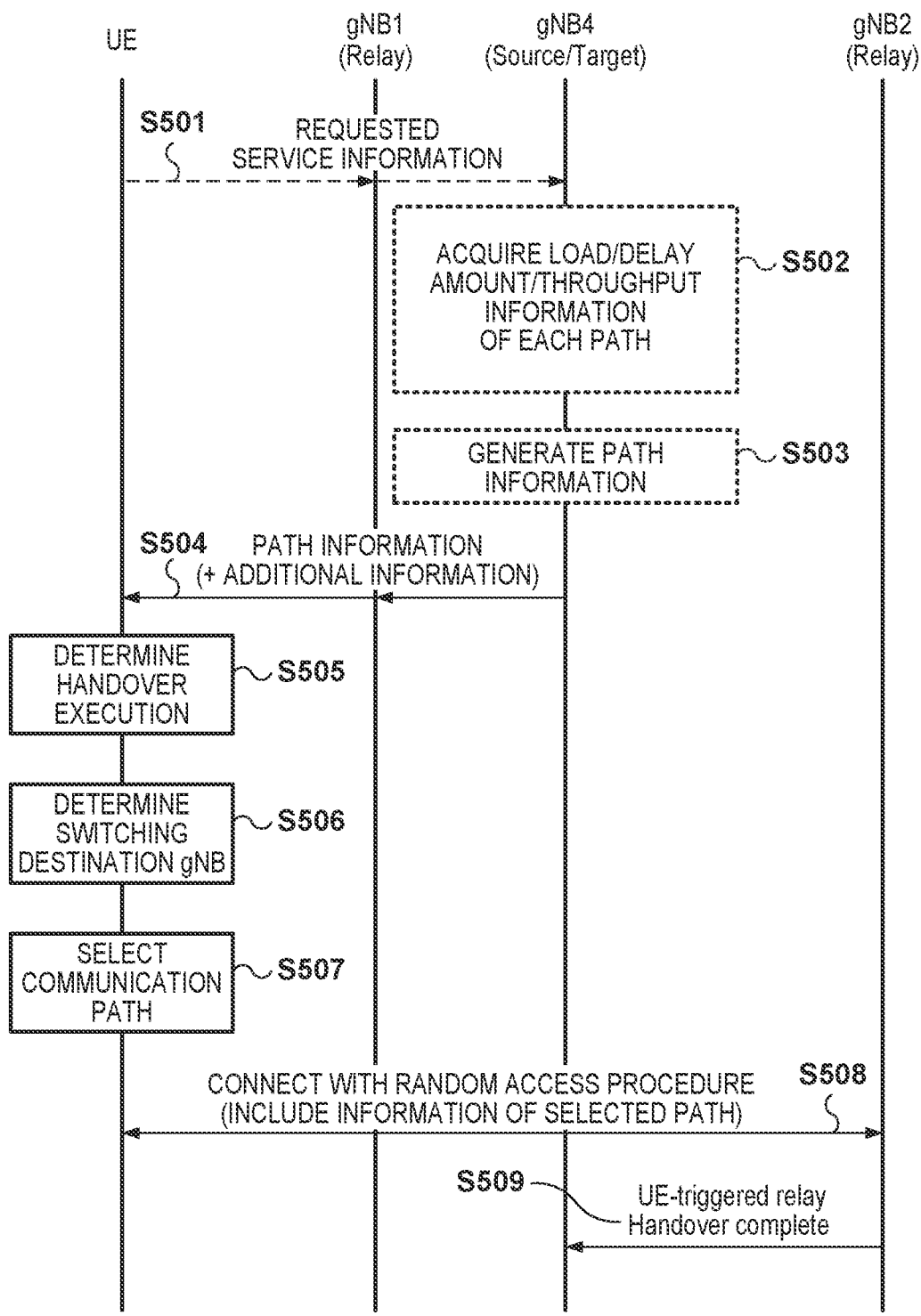
FIG. 5 is a diagram illustrating an example of a processing flow to be executed in a system.

Next, an example of the processing flow to be executed in the wireless communication network will be described using FIGS. 5 and 6. Note that, in FIGS. 5 and 6, it is assumed that the terminal apparatus (UE) is connected to the core network using a communication path in which gNB1 and gNB4 are included. Note that, here, the serving base station is gNB4. FIG. 5 shows an example of the case where the communication path after handover includes a path that connects gNB2 and gNB4, and the serving base station is not changed. FIG. 6 shows an example of the case where the communication path after handover is a path that connects gNB2 and gNB3, and the serving base station is switched to gNB3.

In this processing, first, gNB4 serving as the serving base station notifies the terminal apparatus that is connected via gNB1 of information indicating a candidate communication path that is the switching destination when handover is performed from the communication path that is currently used by the terminal apparatus (step S504). This notification may be performed by a broadcast signal, or by individual signaling such as the RRC signaling, in one example. Note that the individual signaling is used when appropriate path information is notified for each terminal apparatus, such as when notifying path information regarding the communication path with which the service requested by the terminal apparatus can be handled. Note that various types of information such as path information that are described here have already been described above, and the detailed description will be omitted.

Note that gNB4 may acquire from a terminal apparatus, for example, in order to notify the path information, information regarding the service requested by the terminal apparatus (step S501), specify the communication path with which the service request is satisfied based on the information (step S503), and notify the terminal apparatus of the information regarding the specified communication path. Also, gNB4 may acquire information regarding the load of each communication path, the delay amount, the throughput, the reliability, and the like, by monitoring paths (step S502), and transmit the information to the terminal apparatus along with the path information. Also, gNB4 may restrict the communication paths to be notified to the terminal apparatus based on information such as the load of each communication path, the delay amount, the throughput, and the reliability. That is, gNB4 may notify a terminal apparatus of only the path information regarding the communication path to which the service requested by the terminal apparatus is applicable. Note that management of services requested by a terminal apparatus, monitoring the states of communication paths (load, delay amount, throughput, reliability, and the like), and specifying the communication paths to be notified to the terminal apparatus may be performed by a network node (AMF) different from the serving base station. In this case, gNB4 acquires, from the network node, the path information to be notified, and transmits the information to the terminal apparatus.

The terminal apparatus performs determination as to whether or not autonomous handover is to be executed (step S505), in response to an event being detected such as the radio quality of a radio signal transmitted from gNB1 to which the terminal apparatus is directly connect being degraded while performing communication through a communication path including gNB1 and gNB4, for example. Also, the terminal apparatus, upon determining that handover is to be executed, determines which of the base station apparatuses (relay apparatuses) the handover is to be performed to (step S506). In one example, the terminal apparatus measures the radio quality of a radio signal from gNB (base station apparatus or relay apparatus) in the surrounding region that is defined as the end apparatus in the communication path indicated by the path information acquired in step S504, and determines that handover to gNB in the surrounding region is to be executed when the radio quality is sufficiently higher than the radio quality of a radio signal from the currently connected gNB1, or the like. Here, it is assumed that the terminal apparatus has selected gNB2 as the handover destination. Also, the terminal apparatus selects the communication path from gNB that is the connection switching destination determined in step S506 to the core network, based on the path information acquired in step S504 (step S507). For example, the terminal apparatus selects one communication path according to the communication quality requested by the terminal apparatus. In one example, if the amount of data to be transmitted or received is large, a communication path whose load is low and with which high throughput can be obtained is selected. Also, if the amount of data to be transmitted or received is small, but a low delay is requested, a communication path in which the delay amount is small or the number of hops is small is selected without considering the load or throughput. Also, when the reliability is regarded as important, a highly reliable communication path may be selected. Note that these are merely examples, and the terminal apparatus may select the communication path based on various criteria. Also, the selection of a handover destination apparatus and the selection of the communication path may be performed at the same time. For example, the terminal apparatus may specify some communication paths that can be used by the terminal apparatus by determining whether or not the serving base station in each communication path can provide the service requested by the terminal apparatus or in accordance with the load, delay, and the like that have been described above, and determine the handover destination from the end apparatuses in the specified communication paths. Here, it is assumed that the communication path in which gNB2 and gNB4 directly communicate is selected.

The terminal apparatus, after selecting the switching destination gNB and the communication path, establishes the connection with gNB2 that is determined to be the handover destination using a random access procedure (step S508). Note that, here, the terminal apparatus notifies gNB2 that is the handover destination of the information regarding the communication path selected in step S507.

gNB2, upon connecting to the terminal apparatus, notifies the base station apparatus and relay apparatus that are included in the communication path notified in step S508 of a fact that handover led by the terminal apparatus has been performed, and executes switching of the communication path (step S509). Note that, if the switching of the communication path is refused by the base station apparatus or relay apparatus that is included in the selected communication path, gNB2 may notify the terminal apparatus of the fact of being failed in handover. Also, if the switching of the communication path is refused, gNB2 may autonomously select another communication path, and perform switching of the communication path. In this case, gNB2 may notify the terminal apparatus of the information regarding the set communication path.

In the processing in FIG. 6, although the basic flow is similar to those shown in FIG. 5, because the serving base station is switched, when gNB2 notifies gNB3 included in the communication path selected by a terminal apparatus of the fact that handover led by the terminal apparatus has been performed, gNB3 notifies gNB4, which is the serving base station before the handover, of this fact (step S601). Note that this notification to gNB4 may be performed by gNB2. With this, gNB4 notifies gNB3 that is to be the serving base station after the handover of the states of data addressed to the terminal apparatus that is accumulated in a buffer and a sequence number (steps S602 and S603). Note that gNB3 may execute processing for transmitting a message (UE Context Release) for causing gNB4 to discard the information of the UE to gNB4, but this processing is similar to that of known handover, and therefore the detailed description will be omitted.

According to the procedure described above, the handover processing of a terminal apparatus in a wireless communication system using a relay transmission path can be appropriately accomplished. Here, since the terminal apparatus autonomously executes handover, the period of time from when the radio quality degraded until when the handover is completed can be reduced. Also, the serving base station removes, in advance, a communication path with which the service requested by the terminal apparatus cannot be provided from the candidates of connection switching destination, and as a result, the service can be prevented from being interrupted due to the communication path after handover.

The present invention is not limited to the above embodiments and various changes and modifications can be made within the spirit and scope of the present invention. Therefore, to apprise the public of the scope of the present invention, the following claims are made.

The invention claimed is:

1. A terminal apparatus that performs communication using a communication path that is set between the terminal apparatus and a core network via a base station apparatus that is connected to the core network and a relay apparatus that relays communication with the base station apparatus, the terminal apparatus comprising:
   one or more processors; and
   one or more memories that store a computer readable instruction for causing, when executed by the one or more processors, the terminal apparatus to:
   acquire information regarding one or more communication path candidates to which switching is to be performed from a first communication path that is being used, from the base station apparatus that functions as a serving base station in the first communication path, wherein the information regarding the one or more communication path candidates includes a list including the base station and the relay apparatus that form a communication path included in the one or more communication path candidates,
   determine whether or not switching of the communication path from the first communication path is to be performed, and
   perform switching from the first communication path to a second communication path included in the one or more communication path candidates, in response to the determination that switching of the communication path from the first communication path is to be performed after receiving the information regarding the one or more communication path candidates.

2. The terminal apparatus according to claim 1, wherein the information regarding the one or more communication path candidates includes at least any of information indicating load states in each of the one or more communication path candidates, information regarding delays in each of the one or more communication path candidates, information regarding throughputs to be obtained in each of the one or more communication path candidates, and information regarding reliability in each of the one or more communication path candidates.

3. The terminal apparatus according to claim 1, wherein the computer-readable instruction further causes, when executed by the one or more processors, the terminal apparatus to specify a number of hops indicating a number of relays until the core network in a communication path of each of the one or more communication path candidates, from the information regarding the one or more communication path candidates.

4. The terminal apparatus according to claim 1, wherein the terminal apparatus acquires the information regarding the one or more communication path candidates by a broadcast signal from the serving base station.

5. The terminal apparatus according to claim 1, wherein the terminal apparatus acquires the information regarding the one or more communication path candidates that has been extracted according to a service requested by the terminal apparatus, by individual signaling.

6. The terminal apparatus according to claim 1, wherein the terminal apparatus executes switching to the second communication path by establishing a wireless connection with the relay apparatus that is to be directly connected to the terminal apparatus in the second communication path, and by notifying the relay apparatus of information regarding the second communication path.

7. A base station apparatus that functions as a serving base station with respect to a terminal apparatus that performs communication using a communication path that is set between the terminal apparatus and a core network via the base station apparatus that is connected to the core network and a relay apparatus that relays communication with the base station apparatus, the base station apparatus comprising:

one or more processors; and
one or more memories that store a computer-readable instruction for causing, when executed by the one or more processors, the base station apparatus to:
notify the terminal apparatus of information regarding one or more communication path candidates, each of which is a switching destination from a first communication path that is used by the terminal apparatus, wherein the information regarding the one or more communication path candidates includes a list including the base station and the relay apparatus that form a communication path included in the one or more communication path candidates,
wherein the terminal apparatus, upon determining that switching of the communication path from the first communication path is to be performed after receiving the information regarding the one or more communication path candidates, executes switching from the first communication path to a second communication path included in the one or more communication path candidates.

8. The base station apparatus according to claim 7, wherein the information regarding the one or more communication path candidates includes at least any of information indicating load states in each of the one or more communication path candidates and information regarding delays in each of the one or more communication path candidates.

9. The base station apparatus according to claim 7, wherein the base station apparatus notifies the terminal apparatus in a cell formed by the base station apparatus of the information regarding the one or more communication path candidates by transmitting a broadcast signal including the information regarding the one or more communication path candidates.

10. The base station apparatus according to claim 7, wherein the computer-readable instruction further causes, when executed by the one or more processors, the base station apparatus to:
extract the one or more communication path candidates according to a service requested by the terminal apparatus,
wherein the base station apparatus makes notification of information regarding the extracted one or more communication path candidates.

11. The base station apparatus according to claim 10, wherein the base station apparatus notifies the terminal apparatus of the information regarding the one or more communication path candidates by individual signaling.

12. A control method of a terminal apparatus that performs communication using a communication path that is set between the terminal apparatus and a core network via a base station apparatus that is connected to the core network and a relay apparatus that relays communication with the base station apparatus, the control method comprising:
acquiring information regarding one or more communication path candidates to which switching is to be performed from a first communication path that is being used, from the base station apparatus that functions as a serving base station in the first communication path, wherein the information regarding the one or more communication path candidates includes a list including the base station and the relay apparatus that form a communication path included in the one or more communication path candidates;
determining whether or not switching of the communication path from the first communication path is to be performed; and
performing switching from the first communication path to a second communication path included in the one or more communication path candidates, in response to the determination that switching of the communication path from the first communication path is to be performed after receiving the information regarding the one or more communication path candidates.

13. A control method of a base station apparatus that functions as a serving base station with respect to a terminal apparatus that performs communication using a communication path that is set between the terminal apparatus and a core network via the base station apparatus that is connected to the core network and a relay apparatus that relays communication with the base station apparatus, the control method comprising:
notifying the terminal apparatus of information regarding one or more communication path candidates, each of which is a switching destination from a first communication path that is used by the terminal apparatus, wherein the information regarding the one or more communication path candidates includes a list including the base station and the relay apparatus that form a communication path included in the one or more communication path candidates,
wherein the terminal apparatus, upon determining that switching of the communication path from the first communication path is to be performed after receiving the information regarding the one or more communication path candidates, executes switching from the first communication path to a second communication path included in the one or more communication path candidates.

14. A non-transitory computer-readable storage medium that stores a program for causing a computer included in a terminal apparatus that performs communication using a communication path that is set between the terminal apparatus and a core network via a base station apparatus that is connected to the core network and a relay apparatus that relays communication with the base station apparatus, to execute:
acquiring information regarding one or more communication path candidates to which switching is to be performed from a first communication path that is being used, from the base station apparatus that functions as a serving base station in the first communication path, wherein the information regarding the one or more communication path candidates includes a list including the base station and the relay apparatus that form a communication path included in the one or more communication path candidates;
determining whether or not switching of the communication path from the first communication path is to be performed; and
performing switching from the first communication path to a second communication path included in the one or more communication path candidates, in response to the determination that switching of the communication path from the first communication path is to be performed after receiving the information regarding the one or more communication path candidates.

15. A non-transitory computer-readable storage medium that stores a program for causing a computer included in a base station apparatus that functions as a serving base station with respect to a terminal apparatus that performs communication using a communication path that is set between the terminal apparatus and a core network via the base station apparatus that is connected to the core network and a relay apparatus that relays communication with the base station apparatus, to execute:

notifying the terminal apparatus of information regarding one or more communication path candidates, each of which is a switching destination from a first communication path that is used by the terminal apparatus, wherein the information regarding the one or more communication path candidates includes a list including the base station and the relay apparatus that form a communication path included in the one or more communication path candidates, wherein the terminal apparatus, upon determining that switching of the communication path from the first communication path is to be performed after receiving the information regarding the one or more communication path candidates, executes switching from the first communication path to a second communication path included in the one or more communication path candidates.

* * * * *